United States Patent
Mossoba et al.

(10) Patent No.: US 10,155,920 B1
(45) Date of Patent: Dec. 18, 2018

(54) DEFOGGING AND CLEANING METHOD AND BIOBASED VOC-FREE COMPOSITION

(71) Applicants: Magdi Mossoba, Great Falls, VA (US); Nevin Fahmy, Great Falls, VA (US); David Mossoba, New York, NY (US)

(72) Inventors: Magdi Mossoba, Great Falls, VA (US); Nevin Fahmy, Great Falls, VA (US); David Mossoba, New York, NY (US)

( * ) Notice: Subject to any disclaimer, the term of this patent is extended or adjusted under 35 U.S.C. 154(b) by 0 days.

(21) Appl. No.: 15/713,667

(22) Filed: Sep. 24, 2017

(51) Int. Cl.
| | | |
|---|---|---|
| *C11D 1/83* | (2006.01) | |
| *C11D 11/00* | (2006.01) | |
| *C11D 3/20* | (2006.01) | |
| *C11D 3/48* | (2006.01) | |
| *B08B 3/10* | (2006.01) | |
| *B08B 3/08* | (2006.01) | |
| *B08B 1/00* | (2006.01) | |
| *B08B 17/02* | (2006.01) | |
| *C11D 3/50* | (2006.01) | |
| *C11D 1/26* | (2006.01) | |
| *C11D 1/66* | (2006.01) | |

(52) U.S. Cl.
CPC .......... *C11D 11/0035* (2013.01); *B08B 1/006* (2013.01); *B08B 3/08* (2013.01); *B08B 3/10* (2013.01); *B08B 17/02* (2013.01); *C11D 1/83* (2013.01); *C11D 3/2065* (2013.01); *C11D 3/2086* (2013.01); *C11D 3/48* (2013.01); *C11D 3/50* (2013.01); *C11D 1/26* (2013.01); *C11D 1/662* (2013.01)

(58) Field of Classification Search
CPC ..... C11D 11/0035; C11D 1/83; C11D 3/2065; C11D 3/2086; C11D 3/48; C11D 3/50; C11D 1/26; C11D 1/662; B08B 1/006; B08B 3/08; B08B 3/10; B08B 17/02
See application file for complete search history.

(56) References Cited

U.S. PATENT DOCUMENTS

| | | | | |
|---|---|---|---|---|
| 4,615,738 A | * | 10/1986 | Sanders, Jr. ............. | C09K 3/18 106/13 |
| 5,254,284 A | * | 10/1993 | Barone .................... | C03C 17/30 106/13 |
| 5,716,921 A | * | 2/1998 | Neumiller ................ | C11D 1/94 106/13 |
| 2011/0098206 A1 | * | 4/2011 | Lynch .................... | C11D 1/008 510/182 |
| 2014/0349902 A1 | * | 11/2014 | Allef ...................... | A61K 8/361 510/119 |

FOREIGN PATENT DOCUMENTS

WO     WO-9603491 A1 * 2/1996 ........... C11D 3/3765

* cited by examiner

*Primary Examiner* — Sharidan Carrillo

(57) ABSTRACT

A method for preventing the fogging of glass shower doors and bathroom mirrors and for cleaning said surfaces comprising dispensing an aqueous liquid formulation free of volatile organic compounds (VOC), comprising at least 96% USDA-certified biobased, non-toxic, biodegradable ingredients, said formulation being dispensed from a non-aerosol bottle with a sprayer, immediately followed by wiping excess composition, wherein the method critically requires avoiding rinsing and drying, thereby producing an adherent thin film without leaving visible residue, spots or streaks. Said formulation includes surfactants comprising a mixture of C8-C10 and C10-C16 alkyl polyglucosides, caprylyl/capryl glucoside, and a mixture of sodium lauryl glucose carboxylate and lauryl glucoside, wherein the mixture of C8-C10 and C10-C16 alkyl polyglucosides is present in an amount that is 2 to 6 times the weight of the mixture of sodium lauryl glucose carboxylate and lauryl glucoside and 6 to 10 times the weight of caprylyl/capryl glucoside.

9 Claims, No Drawings

DEFOGGING AND CLEANING METHOD AND BIOBASED VOC-FREE COMPOSITION

BACKGROUND OF THE INVENTION

During showering, soap scum accumulates on glass shower doors. Soap scum consists of water-insoluble materials (calcium stearate and magnesium stearate) that are formed when calcium and magnesium ions in hard water react with soap. In addition, during and after showering when the warmer moisture in the air condenses on the cooler surface of glass shower doors or bathroom mirrors, water will bead-up on these surfaces, and steam or moisture will condense into water, thus preventing a clear, fog-free vision through glass shower doors and bathroom mirrors. Water vapor condenses on glass shower doors and bathroom mirrors when the temperature of the air adjacent to these surfaces falls below the dew-point. The dew-point is the temperature at which air reaches saturation, and water vapor condenses into liquid water often as an opaque or translucent thin film, thus leading to foggy glass shower doors and bathroom mirrors. The cleaning, scrubbing and removal of soap scum is time-consuming and costly, and the dissipation of water condensed on glass shower doors and bathroom mirrors can be slow or may not occur under foggy conditions. Thus efficiently preventing water from beading up and allowing it to sheet off of glass shower doors, to prevent both the adherence of soap scum as well as the condensation of water on glass bathroom surfaces, is an essential condition for transparent glass shower doors and bathroom mirrors to have utility. Water sheets off of glass shower doors when hydrophilic ingredients in a liquid formulation applied to these doors lower the surface tension of water and prevent it from beading up on the glass shower door surface and depositing and accumulating soap scum.

Disclosed claims for both cleaning glass surfaces and defogging mirrors are limited to formulations that include petrochemical, flammable, volatile organic compounds (VOC), or toxic or hazardous ingredients. The present invention relates to addressing these limitations and meeting the need for a biobased, non-toxic, biodegradable, aqueous liquid formulation free of VOC and a method for dispensing formulation for sheeting water off of glass shower doors during showering and preventing the deposition and accumulation of water-insoluble soap scum, for preventing glass shower doors and bathroom mirrors from fogging, and for cleaning said surfaces.

For many decades formulations of some all-purpose liquid detergents for cleaning hard surfaces such as bathtubs, tiled walls and floors, painted panels, glass surfaces, etc., which also exhibit anti-fogging properties, have incorporated among their ingredients harmful chemicals. For example, the formulation disclosed in U.S. Pat. No. WO1996003491A1 contains a cosurfactant with functional groups including diethylphosphate that is considered hazardous by the 2012 OSHA Hazard Communication Standard (29 CFR 1910.1200). It also contains the anionic surfactant alkyl benzene sulfonate which is corrosive, and may cause skin or eye burns as well as irritation to digestive and respiratory tracts. Pat. No. US005716921A discloses formulations containing toxic quaternary ammonium cationic surfactants, and those of U.S. Pat. No. 5,254,284A contain silicone glycol that is harmful if inhaled or absorbed through the skin. Good cleaning products do not necessarily enhance their antifogging efficacy and typically contain harsh, toxic, or synthetic chemicals, and extreme caution needs to be exercised when using them in order to minimize contact with human skin. Even at low concentrations, these aggressive chemicals can defat dermal oils.

Antifog formulations have also been disclosed in the literature. For instance, in U.S. Pat. No. 4,615,738, a transparent antifog composition is disclosed for nonporous substrates which comprise an aqueous solution of hexamethylcyclotrisiloxane, an aliphatic alcohol, and a surfactant. However, hexamethylcyclotrisiloxane is not recommended for institutional and household use because it is flammable and in laboratory animals it reportedly elicits hyperplasia and a chronic inflammatory response and leads to liver carcinogenesis.

Pat. No. US 2011/0098206 A1 discloses a hard surface treating composition that provides anti-fogging and cleaning benefits and includes among its ingredients a low percentage of VOC. However, exposure to toxic VOC, which are regulated by EPA and State regulatory agencies, is not recommended.

An increasing number of plant-based surfactants became available and used as ingredients in cleaning and other consumer or industrial products. They are alkyl polyglycosides (or alkyl polyglucosides) produced from renewable raw materials by reaction of glucose and fatty alcohol. The structure of an alkyl polyglycoside molecule consists of a hydrocarbon chain or tail that is hydrophobic consisting of a saturated fatty alcohol, such as dodecanol, derived from palm or coconut oil. The remaining hydrophilic portion of alkyl polyglycoside is derived from glucose or dextrose commonly obtained from corn starch. Plant-based surfactants are increasingly favored over those derived from petroleum because they help the industry comply with its sustainability goals by providing nature-based, biodegradable ingredients.

Accordingly, there is a need for developing a biobased, non-toxic, free of VOC, biodegradable, aqueous liquid formulation derived from natural and renewable sources that is available in stable, aqueous solution having a long shelf life, and available at an affordable price specifically for sheeting water off of glass shower doors during showering, for preventing in the first place the deposition and accumulation of soap scum, and for rendering treated bathroom glass surfaces resistant to fogging and clean. There is further a need for an effective, simple method for delivering by spraying every day or several days an anti-fog anti-soap scum liquid composition in sufficient amounts, thereby producing an adherent thin transparent film that dries after 10-20 seconds, yet leaving no visible residue, films, spots or streaks on treated glass shower doors and bathroom mirrors.

BRIEF SUMMARY OF THE INVENTION

A method for defogging glass shower doors and bathroom mirrors, for repelling and preventing the accumulation of soap scum on glass shower doors, and for cleaning said surfaces relates to treating these surfaces with a transparent, at least 96% biobased, non-toxic, free of VOC, biodegradable, aqueous formulation. A method comprising dispensing every day or several days a liquid formulation from a non-aerosol bottle with a sprayer, immediately followed by gently wiping excess composition from glass surfaces, and requiring avoiding rinsing and drying, in order to deliver sufficient amounts without leaving on unrinsed glass surfaces visible residue, films, spots or streaks. Said formulation consisting of an aqueous composition derived from natural and renewable sources includes effective relative amounts of an anionic surfactant, three nonionic surfactants, a nonionic surfactant enhancer, a stabilizer, two preservatives, and a perfume.

DETAILED DESCRIPTION OF THE INVENTION

The present invention provides a method for using a stable, transparent, biobased, non-toxic, biodegradable, aqueous liquid composition free of VOC in the form of microemulsions (and non-microemulsions), specifically for sheeting water off of glass shower doors during showering, thus preventing in the first place the deposition and accumulation of water-insoluble soap scum, for preventing fog formation on glass shower doors and bathroom mirrors, and for cleaning said surfaces. A method comprising dispensing every day or several days aqueous liquid formulations from a non-aerosol bottle with a finger or trigger sprayer, immediately followed by gently wiping excess composition from treated surfaces, wherein the method requires avoiding and refraining from rinsing and drying in order to deliver on unrinsed glass surfaces sufficient amounts of the formulation thereby producing on unrinsed glass surfaces an adherent thin transparent film that dries after 10-20 seconds without leaving visible residue, films, spots or streaks, thereby providing considerable cost and time savings by minimizing the time-consuming need for using harsh chemicals and for scrubbing and rinsing accumulated soap scum off glass shower doors.

The present invention provides an aqueous liquid formulation that is USDA-certified to be at least 96% biobased for which no prior art exits and comprising non-toxic, VOC-free, biodegradable ingredients that satisfy the criteria of performance, ecological sustainability and human safety, and is affordable. The surfactants in the formulation are derived from natural, renewable raw materials of plant origin that are biodegradable: fatty alcohol from coconut or palm kernel oil and glucoside from native, unmodified corn starch. The surfactants are not derived from petrochemicals. The expressions ecologically-friendly, environmentally sustainable, naturally-based are understood to mean substances or mixtures that are derived from natural sources, whole or substantially all, and none was synthesized from petroleum. Therefore, these substances or mixtures have minimal adverse environmental impact when the entire life-cycle of these chemicals is studied.

In one aspect, the invention generally provides a stable, clear (as a result of the formation of a microemulsion) biobased, aqueous composition in the form of an oil-in-water microemulsions having an aqueous phase and an oil phase. The dilute microemulsion includes, on a weight basis, from about 0.1% to 4% of each of the anionic surfactant sodium lauryl glucose carboxylate and the nonionic surfactant lauryl glucoside, from about 1% to 6% of each the nonionic surfactants C8-C10 alkyl polyglucoside and C10-C16 alkyl polyglucoside, from 0.2% to 2% of the nonionic surfactant enhancer caprylyl/capryl glucoside, from about 1% to 4% of the stabilizer vegetable glycerin which also minimizes streaking, from about 0.1% to 1% of the preservative citric acid and from about 0.02% to 1% of an antibacterial and antifungal preservative, from about 0.01% to 0.9% of a perfume or water-insoluble hydrocarbon, and the balance being water, said proportions being based on the total weight of the composition.

The pH of the aqueous compositions of the invention may be any pH at which the microemulsion retains its efficacy in sheeting water off of glass shower doors during showering and in preventing fog from condensing on glass shower doors and bathroom mirrors. The pH values of the antifogging composition of the present invention falls between 4 and 6, therefore the formulations may be sold without the need for hazardous substance warning labels. More specifically, such composition is classified as nontoxic by ingestion, not a primary skin irritant, not corrosive to the skin, and not an eye irritant, within the meaning of the federal laws for hazardous substances.

Water is used as a solvent in an amount sufficient to make the total composition equal to 100% by weight. The use of distilled and/or deionized water is recommended. Water is added in amounts which are needed to prepare a diluted composition and required to ensure the sheeting off of water and antifogging and cleaning efficacies are achieved.

The liquid composition of the present invention has been demonstrated to have a shelf life of at least one year.

The invention claimed is:

1. A method of defogging, cleaning and preventing deposition and accumulation of water-insoluble soap scum on glass shower doors and bathroom mirrors, the method consisting of:
    a) providing an aqueous VOC-free, liquid composition consisting by weight of:
        from about 0.1% to 4% of sodium lauryl glucose carboxylate,
        from about 0.1% to 4% of lauryl glucoside,
        from about 1% to 6% of C8-C10 alkyl polyglucoside,
        from about 1% to 6% of C10-C16 alkyl polyglucoside,
        from 0.2% to 2% of caprylyl/capryl glucoside,
        from about 1% to 4% of vegetable glycerin,
        from about 0.1% to 1% of citric acid,
        from about 0.02% to 0.09% of an antibacterial and antifungal preservative,
        from about 0.01% to 0.9% of a perfume or water-insoluble hydrocarbon,
        and the balance being water, wherein the proportions are based on a total weight of the composition;
    b) treating surfaces of glass shower doors and bathroom mirrors by spraying with said liquid composition to defog, clean and prevent deposition and accumulation of water-insoluble soap scum present on said surfaces; and
    c) immediately wiping said surfaces with a damp cloth to remove excess of said liquid composition to produce a film that dries after 10-20 seconds without leaving visible residue, spots or streaks.

2. The method of claim 1, wherein the sodium lauryl glucose carboxylate and the lauryl glucoside are each present in an amount of from about 0.5% to 2%.

3. The method of claim 1, wherein the C8-C10 alkyl polyglucoside and the C10-C16 alkyl polyglucoside are each present in an amount from about 3% to 5%.

4. The method of claim 1, wherein the caprylyl/capryl glucoside is present in an amount of from about 0.5% to 1.5%.

5. The method of claim 1, wherein the vegetable glycerin is present in an amount of from about 1.5% to 3%.

6. The method of claim 1, wherein the citric acid is present in an amount of from about 0.2% to 0.8%.

7. The method of claim 1, wherein the antibacterial and antifungal preservative is present in an amount of from about 0.04% to 0.07%.

8. The method of claim 1, wherein the perfume or the water-insoluble hydrocarbon is present in an amount from about 0.02% to 0.08%.

9. The method of claim 1, wherein the liquid composition has a pH level ranging from about 4 to 6.

\* \* \* \* \*